(12) United States Patent
Lev

(10) Patent No.: US 8,475,973 B2
(45) Date of Patent: Jul. 2, 2013

(54) MECHANICALLY JOINED BIPOLAR PLATES AND METHOD THEREFOR

(75) Inventor: Leonid C. Lev, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 947 days.

(21) Appl. No.: 12/327,080

(22) Filed: Dec. 3, 2008

(65) Prior Publication Data

US 2010/0136382 A1    Jun. 3, 2010

(51) Int. Cl.
   *H01M 8/04*    (2006.01)
(52) U.S. Cl.
   USPC ............................................. 429/512
(58) Field of Classification Search
   USPC ................................. 429/400–535
   See application file for complete search history.

(56) References Cited

U.S. PATENT DOCUMENTS

| 5,532,073 | A  | * | 7/1996 | Hirata et al. | 429/460 |
|---|---|---|---|---|---|
| 6,777,126 | B1 | * | 8/2004 | Allen | 429/434 |
| 7,252,218 | B2 |   | 8/2007 | Gayden et al. | |
| 2004/0013931 | A1 | * | 1/2004 | Takamura et al. | 429/36 |
| 2005/0233196 | A1 | * | 10/2005 | Diez | 429/34 |
| 2008/0107944 | A1 | * | 5/2008 | Goebel | 429/26 |
| 2010/0167105 | A1 | * | 7/2010 | Finsterwalder et al. | 429/34 |

FOREIGN PATENT DOCUMENTS

WO    WO 2008/141713 A1  * 11/2008

* cited by examiner

*Primary Examiner* — Patrick Ryan
*Assistant Examiner* — Muhammad Siddiquee
(74) *Attorney, Agent, or Firm* — BrooksGroup

(57) ABSTRACT

Exemplary embodiments include a product and a method of a bipolar plate assembly having a pair of plates, the bipolar plate assembly being a part of a fuel cell stack. The pair of plates may be joined together at their respective borders by a mechanical forming process.

11 Claims, 2 Drawing Sheets

MECHANICALLY JOINED BIPOLAR PLATES AND METHOD THEREFOR

TECHNICAL FIELD

The technical field generally relates to products including bipolar plate assemblies, and methods of joining bipolar plate assemblies.

BACKGROUND

Bipolar plate assemblies are commonly used as components of a fuel cell stack. A bipolar plate assembly may have a pair of separate plates that form internal channels for coolant flow and external channels for fuel and oxidant flow in the fuel cell stack. In some cases, it may be required to seal the internal channels from the external channels and from other parts of the fuel cell stack.

SUMMARY OF EXEMPLARY EMBODIMENTS OF THE INVENTION

One exemplary embodiment includes a product which may include a bipolar plate assembly that may be used in a fuel cell stack. The bipolar plate assembly may include a first plate bounded by a first border, and may include a second plate bounded by a second border. The first plate and the second plate may be joined together at the first and second borders by an overlapping fold.

One exemplary embodiment includes a method which may include providing a first plate and a second plate of a bipolar plate assembly that may be used in a fuel cell stack. The method may also include holding the first plate and the second plate in an overlapping relationship. The method may further include bending the first plate and the second plate together at a respective border thereof in order to form a seal between the borders.

One exemplary embodiment includes a method which may include providing a first plate and a second plate of a bipolar plate assembly that may be used in a fuel cell stack. The method may also include holding the first plate against the second plate which may be done by a workpiece holder. The method may further include overlapping a first border of the first plate with a second border of the second plate, and may include sealing the first border and the second border together.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figures 1, 2:
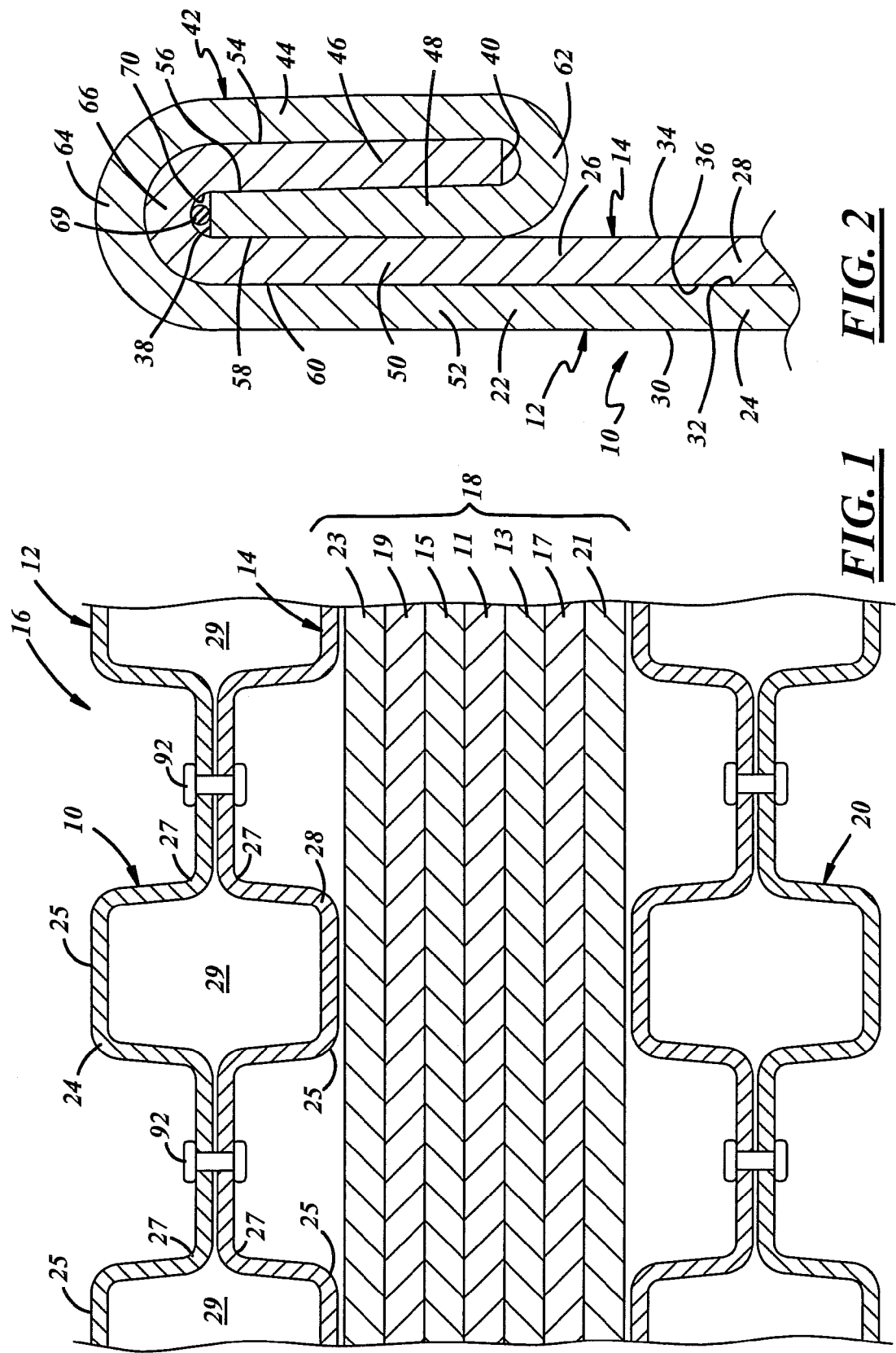
FIG. 1 is a cross-section schematic of an exemplary fuel cell stack.
FIG. 2 is a cross-section schematic of an exemplary embodiment of an overlapping fold joining a pair of plates of a bipolar plate assembly.

The figures illustrate exemplary embodiments of a bipolar plate assembly 10 and of a method of joining a first or anode plate 12 and a second or cathode plate 14 of the bipolar plate assembly. Referring to FIG. 1, the bipolar plate assembly 10 may be but one component of a fuel cell stack portion 16 which may also include a soft goods portion 18 and a second bipolar plate assembly 20 similar to the bipolar plate assembly 10. One exemplary soft goods portion 18 may include a membrane 11, anode and cathode electrodes 13, 15, microporous layers 17, 19, and gas diffusion media layers 21, 23. Each bipolar plate assembly 10, 20 may be designed and may be assembled at least in part by a joining process which does not compromise the coating that may have been applied to the first plate 12, to the second plate 14, or to both, which enables use of thinner gauge first and second plates, which augments electric conductivity between the first and second plates, and which facilitates mass production of the bipolar plate assembly.

The first plate 12 and the second plate 14 may be initially separate pieces that are subsequently put together to form the bipolar plate assembly 10. The first and second plates 12 and 14 may be made of relatively inexpensive and lightweight material including, but not limited to, a carbon steel, an aluminum alloy, a titanium, a stainless steel, or other suitable materials. Some of these materials may permit a plate having a thinner gauge as compared to other materials which may require a thicker gauge. In one exemplary embodiment, the first and second plates 12 and 14 may each include a core material sandwiched between a pair of surface materials. And each plate 12, 14 may define multiple lands 25 and channels 27 providing a reactant gas flow path. When the first and second plates 12, 14 are joined, multiple coolant flow channels 29 may be defined therebetween. In one general example, the first and second plates 12 and 14 may be formed by cutting metal sheets from a roll, treating the surfaces of the metal sheets with one or more coatings that may protect against corrosion, dissolving, and which may enhance electric conductivity, and forming a three-dimensional contour in the metal sheets such as by a drawing, stamping, or other processes. Skilled artisans will appreciate the variations in this forming process, including having more, less, and/or different steps than described above.

Referring to FIG. 2, the first plate 12 may have a first border 22 bounding a first central portion 24, and the second plate 14 may have a second border 26 bounding a second central portion 28. The first and second borders 22, 26 may include a peripheral portion of the respective plate that extends beyond the mere edge thereof and a bit toward a center point of the respective plate, and the first and second central portions 24, 28 may constitute the remaining portions of the respective plate. The first plate 12 may also have a first outer surface 30 and an oppositely located first inner surface 32, and the second plate 14 may have a second outer surface 34 and an oppositely located second inner surface 36. The first plate 12 may have a first edge 38 and the second plate 14 may have a second edge 40.

When the first and second plates 12, 14 are joined, the first border 22 and the second border 26 may form an overlapping fold 42. The overlapping fold 42 may, in cross-section, create multiple seams (e.g., a double seam) by lapping the first border 22 and the second border 26 tightly over each other.

In one sense, the overlapping fold 42 may form a tongue and groove joint between the first and second borders 22, 26—the second border constituting the tongue portion and the first border constituting the groove portion, and vice versa. The overlapping fold 42 may be formed substantially continuously around the borders, but may not be formed at various places along the borders including, but not limited to, a coolant inlet and a coolant outlet.

Referring to FIG. 2, the overlapping fold 42 may have five parallel and separate layers that, from top-to-bottom, may include a first layer 44 of the first plate 12, a second layer 46 of the second plate 14, a third layer 48 of the first plate, a fourth layer 50 of the second plate, and a fifth layer 52 of the first plate. The overlapping fold 42 may define four interfaces between the respective inner and outer surfaces of the first plate 12 and the second plate 14 that, from top-to-bottom, may include a first interface 54, a second interface 56, a third interface 58, and a fourth interface 60. One or more of the interfaces may, though need not, form an airtight seal in the overlapping fold 42. The overlapping fold 42 may also have three separate bends that separate the various interfaces and that may include a first bend 62 of the first plate 12, a second bend 64 of the first plate, and a third bend 66 of the second plate 14.

The overlapping fold 42 may be formed by a process with various steps which may include a progressive bending process. In different embodiments, the process need not be performed in the order described, may differ in one or more particular steps, may have additional steps than those shown and described, and may not necessarily include every step that is shown and described. In one exemplary process, the coating may be applied, the first and second plates 12, 14 may be held, a sealant 69 may be provided, preliminary bends may be formed, final bends may be formed, and the first and second plates may be mechanically fastened together.

The one or more coatings may be applied to the inner and/or outer surfaces of the first plate 12 and the second plate 14, and at the first and second borders 22, 26. This may be a separate step, or the same step as described above for coating the metals sheets of the first and second plates 12, 14. The coating may protect the first plate 12 and the second plate 14 against corrosion, dissolving, and may enhance electric conductivity between the plates. The coating may be applied to all of, or just a portion of the inner and/or outer surfaces. The coating may be applied before the bending process begins such as before the first plate 12 and the second plate 14 are held, may be applied while the first plate 12 and the second plate 14 are in the roll-sheet stock form, or may be applied at another time.

Figure 3:
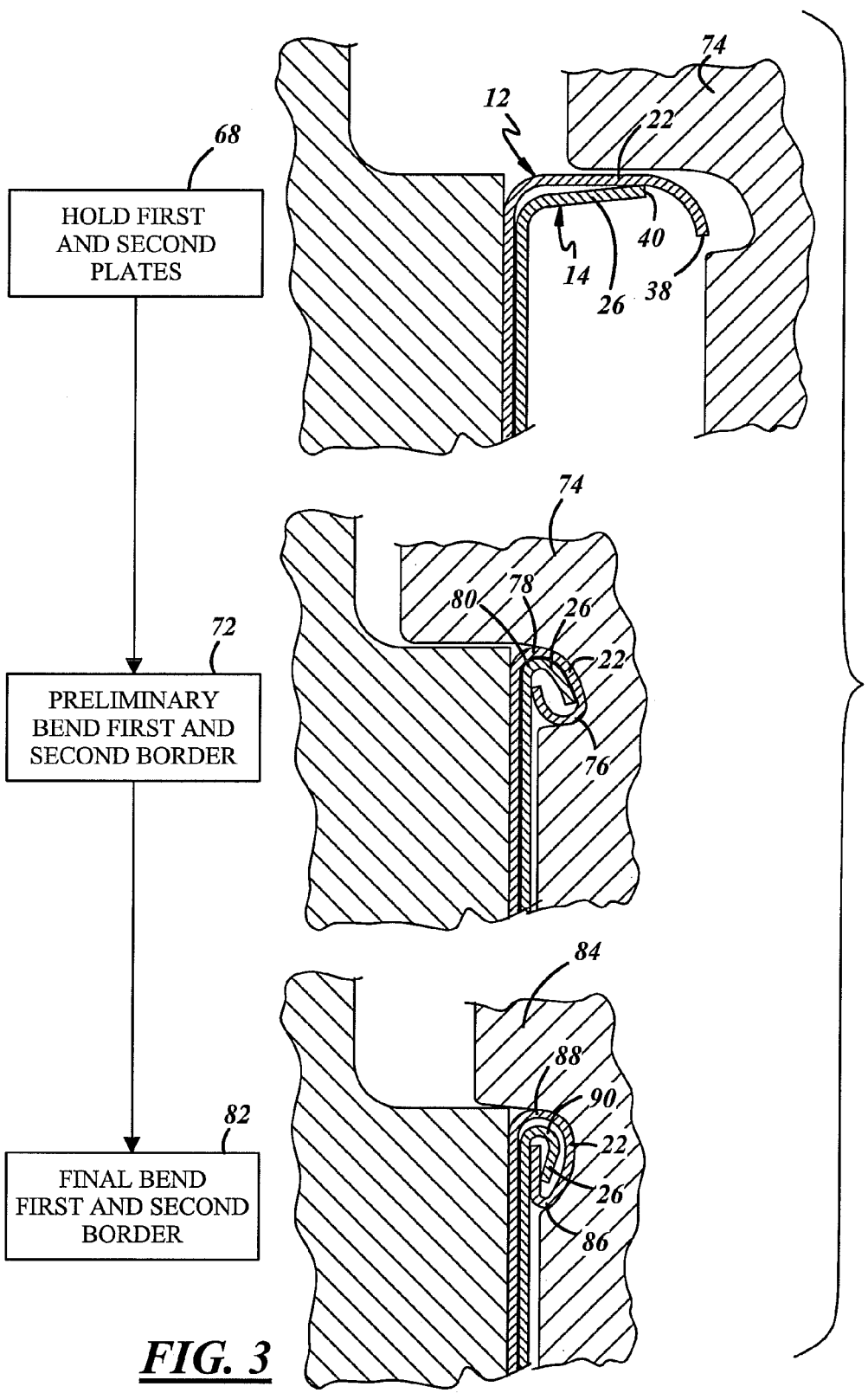
FIG. 3 is a schematic showing some steps of an exemplary method of forming the overlapping fold of FIG. 2.

Referring to FIG. 3, in a holding step 68, the first and second plates 12 and 14 may be fixed stable by a workpiece holder such as a production fixture (not shown) to permit the subsequent bending steps. The first and second plates 12 and 14 may be held in an overlapping relationship, one on top of the other, with their respective inner surfaces contacting at some points along the overlap. The first border 22 and the second border 26 may initially, though need not, have a slight curl in them. The slight curl may be caused by being previously stocked in the roll-sheet form, or otherwise may be formed by a machining process. The first border 22 may be positioned in the workpiece holder such that it overhangs the second border 26 to provide enough material to form the overlapping fold 42 as will become apparent as the description proceeds.

In another step, the sealant 69 may, though need not, be provided in the overlapping fold 42 to help provide one or more airtight seals in the overlapping fold. The sealant 69 may be a rubber gasket, a liquid-seal painted on one or more surfaces, a sealing compound, or the like. Referring to FIG. 2, the sealant 69 may be located between one or more of the first, second, third, and fourth interfaces 54, 56, 58, and 60, at a space defined adjacent a bend such as at a space 70 formed between the first edge 38 and the third bend 66, at another location, or at any combination thereof. This step may be performed at a point before the bending process.

Referring again to FIG. 3, in a preliminary bending step 72, the first border 22 and the second border 26 may be bent and curled close together by a first die 74 of a machine, such as a seam roller machine. The first die 74 may have a cross-sectional profile that imparts a first and a second preliminary bend 76 and 78 in the first border 22, and that imparts a third preliminary bend 80 in the second border 26. The exact cross-sectional profile of the first die 74 may vary and may depend on, among other factors, the material used for the first and second plates 12 and 14, the gauge of the first and second plates, and the amount and volume of the sealant 69 that may be used in some cases. The step 72 is preliminary in the sense that it may not produce the overlapping fold 42 in a final form. The seam roller machine may bend the first and second borders 22 and 26 simultaneously by moving the first die 74 with respect to the first and second borders, or by moving the first and second borders with respect to the first die.

In a final bending step 82, the first border 22 and the second border 26 may be bent together and substantially flattened by a second die 84 in order to form the final shape of the overlapping fold 42. The second die 84 may be part of a machine, such as the seam roller machine. The step 82 may sequentially follow the step 72 such that the existing preliminary bends are turned into final bends. The second die 84 may have a cross-sectional profile that imparts a first final bend 86 (which is equivalent to the first bend 62 of FIG. 2) and a second final bend 88 (which is equivalent to the second bend 64 of FIG. 2) in the first border 22, and imparts a third final bend 90 (which is equivalent to the third bend 66 of FIG. 2) in the second border 26. The exact cross-sectional profile of the second die 84 may vary and may depend on, among other factors, the type of material used for the first and second plates 12 and 14, the gauge of the first and second plates, the amount and volume of the sealant 69 that may be used, and the desired flattening of the first and second borders 22 and 26. This step is final in the sense that no other forming steps may be needed at the first and second borders 22 and 26, though some forming steps or other steps could be subsequently performed. In the step 82, the seam roller machine may bend one section of the first and second borders 22 and 26 simultaneously by moving the second die 84 with respect to the first and second borders, or by moving the first and second borders with respect to the second die 84.

In another step, the first plate 12 and the second plate 14 may be mechanically fastened together at the first and second central portions 24 and 28 which may provide, among other things, a more electrically conductive connection as compared to other connections. This step may help prevent the first plate 12 and the second plate 14 from ballooning away from each other when a coolant is filled in the coolant flow channels 25. The mechanical fastening may include, but is not limited to, riveting, bolting, and screwing. Referring to FIG. 1, in one riveting example, a plurality of rivets 92 may be pierced through both the first and second plate 12 and 14 in a grid pattern whereby the rivets extend across the plates up-and-down with a one inch space between neighboring rivets, and the rivets extend from side-to-side with a one inch space between neighboring rivets. The rivets 92 may be located at the channels 23. The mechanical fastening may be used instead of, or in addition to, other processes that may be used to form the various channels and to form an electrically conductive connection, including roll bonding. In other embodiments, the first and second plates 12, 14 may be fastened together by a variety of methods including, but not limited to, welding, adhesive bonding, stacking, and other ways.

The above description of embodiments of the invention is merely exemplary in nature and, thus, variations thereof are not to be regarded as a departure from the spirit and scope of the invention.

What is claimed is:

1. A product comprising:
a bipolar plate assembly for a fuel cell stack, the bipolar plate assembly including a first plate bounded by a first border and including a second plate bounded by a second border, the first plate and the second plate being joined together at the first and second borders by an overlapping fold wherein at least a portion of the border of the first plate is formed around at least a portion of the border of the second plate such that the portion of the border of the second plate is mechanically locked by the portion of the border of the second plate and wherein the overlapping fold is comprised of alternating layers of the first and second plate borders, and a sealant in the overlapping fold.

2. A product as set forth in claim 1 wherein, in cross-section, the overlapping fold comprises three separate bends.

3. A product as set forth in claim 2 wherein the first plate comprises two of the three bends in the first border, and the second plate comprises one of the three bends in the second border.

4. A product as set forth in claim 1 wherein, in cross-section, the overlapping fold comprises four generally parallel interfaces, each interface formed between a surface of the first plate and a surface of the second plate, and each interface being separated from the other interfaces by at least one bend that is formed in the overlapping fold.

5. A product as set forth in claim 1 wherein, in cross-section, the overlapping fold comprises five separate layers of the first plate and second plate.

6. A product as set forth in claim 1 wherein the overlapping fold forms one or more airtight seals therebetween.

7. A product as set forth in claim 1 further comprising a mechanical fastener further joining the first plate and the second plate at a location spaced a distance from the overlapping fold.

8. A product as set forth in claim 1 wherein a portion of the first plate defines a first channel and a portion of the second plate defines a second channel and further comprising a mechanical fastener further joining the first plate and the second plate at the portion of the first plate defining the first channel and the portion of the second plate defining the second channel.

9. A product comprising:
a bipolar plate assembly for a fuel cell stack, the bipolar plate assembly including a first plate bounded by a first border and including a second plate bounded by a second border, the first plate and the second plate being joined together at the first and second borders by an overlapping fold, and a mechanical fastener further joining the first plate and the second plate at a location spaced a distance from the overlapping fold wherein at least a portion of the border of the first late is formed around at least a portion of the border of the second plate such that the portion of the border of the second plate is mechanically locked by the portion of the border of the second late and wherein the overlapping fold is comprised of alternating layers of the first and second plate borders.

10. A product comprising:
a bipolar plate assembly for a fuel cell stack, the bipolar plate assembly including a first plate bounded by a first border and including a second plate bounded by a second border, the first plate and the second plate being joined together at the first and second borders by an overlapping fold, and a protective coating over the first plate and a protective coating over the second plate, and wherein the first plate and second plate are not welded together wherein at least a portion of the border of the first plate is formed around at least a portion of the border of the second plate such that the portion of the border of the second plate is mechanically locked by the portion of the border of the second plate and wherein the overlapping fold is comprised of alternating layers of the first and second plate borders.

11. A product comprising:
a bipolar plate assembly for a fuel cell stack, the bipolar plate assembly including a first plate bounded by a first border and including a second plate bounded by a second border, the first plate and the second plate being joined together at the first and second borders by an overlapping fold forming a tongue and groove joint between the first and second borders, the first plate having a first portion overlying a first portion of the second plate, the first plate and second plate both being bent in an over lapping relationship and so that the tongue and groove joint between the first and second borders overlies the first portion of the first plate and the first portion of the second plate.

* * * * *